United States Patent [19]
Kojima

[11] Patent Number: 6,132,180
[45] Date of Patent: *Oct. 17, 2000

[54] AUTOMATIC PUMPING APPARATUS UTILIZING WAVE MOTION

[76] Inventor: Masayuki Kojima, 8-1-508, Yoyogi 3-Chome, Shibuya-ku, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/949,395

[22] Filed: Oct. 14, 1997

Related U.S. Application Data

[62] Continuation of application No. 08/758,760, Dec. 3, 1996, abandoned, which is a continuation of application No. 08/362,440, filed as application No. PCT/JP93/00888, Jun. 29, 1993, abandoned.

[30] Foreign Application Priority Data

Jun. 30, 1992 [JP] Japan ..................................... 4-210597

[51] Int. Cl.⁷ ..................................................... F04B 17/00
[52] U.S. Cl. .......................... 417/333; 417/331; 417/545; 417/567
[58] Field of Search ..................................... 417/331, 333, 417/545, 567; 60/497

[56] References Cited

U.S. PATENT DOCUMENTS

| | | | |
|---|---|---|---|
| 547,338 | 10/1895 | Duffy | 417/333 |
| 2,855,851 | 10/1958 | Shuman | 417/333 |
| 4,076,463 | 2/1978 | Welczer | 417/331 |
| 4,603,551 | 8/1986 | Wood | 60/497 |

FOREIGN PATENT DOCUMENTS

| | | | |
|---|---|---|---|
| 449685 | 6/1949 | Italy | 417/331 |
| 51-69201 | 6/1976 | Japan . | |
| 57-91380 | 6/1982 | Japan . | |

*Primary Examiner*—Charles G. Freay
*Attorney, Agent, or Firm*—Larson & Taylor PLC

[57] ABSTRACT

An automatic pumping apparatus utilizing wave motion comprises one or more than one sink-and-float members provided so as to move up and down in accordance with a wave motion, positioned below the respective sink-and-float members, connected to the respective sink-and-float members via a transmission mechanism and adapted to slidingly move in respective one-end-open fixed cylinders in accordance with the up and down movement of the sink-and-float members, the horizontal cross sectional area of each piston being made small relative to that of each sink-and-float member and inversely proportional to the pumping height, whereby water can be pumped to a reservoir tank through pumping pipes extending from the other ends of the cylinders to positions higher than the ranges of up and down movements of the sinkand-float members by the operations of pistons.

4 Claims, 2 Drawing Sheets

AUTOMATIC PUMPING APPARATUS UTILIZING WAVE MOTION

This application is a continuation of application Ser. No. 08/758,760 filed Dec. 3, 1996, now abandoned, which is a continuation of 08/362,440 filed Dec. 29, 1994, now abandoned, which is a 371 of PCT/JP93/00888 filed Jun. 29, 1993.

TECHNICAL FIELD

The present invention relates to an automatic pumping apparatus utilizing wave motion to be used for hydropower generation, irrigation, salt manufacturing, fire fighting, an aquarium or some other application.

BACKGROUND TECHNOLOGIES

Various researches have been made for effectively abstracting energy of wave motion or energy stored in head waters in the oceans and rivers. For example, Japanese Patent Kokai No. 62-248876 discloses a pumping apparatus utilizing the ocean tides. This apparatus comprises a tower body erected in the bottom of the sea and projecting from the water surface, a reservoir tank arranged at the top of the tower body, a plurality of pumping tanks arranged around the tower body, pistons vertically slidably arranged within the respective pumping tanks, floats coupled to the respective pistons via a link mechanism so as to move the pistons up and down in accordance with the tidal movement, said pumping tanks being provided with respective sea water inlet ports arranged at a height located below the sea level at high tide and provided with a sea water intake valve for introducing sea water, and exhaust pipes arranged at the top of the respective pumping tanks in order to keep the pumping tanks in communication with the reservoir tank and provided with respective check valves in order to block any reverse flow of sea water from the reservoir tank to the pumping tanks.

However, the pumping efficiency of such a proposed known pumping apparatus is very low because it operates only once for a cycle of tidal movement of sea water and it is impossible to pump up water to a height of 100 m or so, making the apparatus poorly applicable to industrial use, because it was designed without considering the ratio of the cross sectional area of the floats to that of the pistons. Additionally, the link mechanism coupling each float and piston of the apparatus is complicated and hence liable to be damaged when subjected to large energy of wave motion so that there is no way of ensuring a stable operation for the user of the apparatus for a long period of time and the fact that maintenance can also pose problems which make such an apparatus hardly feasible for practical applications.

Meanwhile, the use of petroleum as a source of energy is accompanied by serious environmental problems such as destruction of nature and air pollution, aside from the fact it is a limited natural resource. Therefore, the need of developing apparatuses and plants for effectively absorbing energy from water in the sea and rivers on an industrial basis has been increasing as they can provide means for solving these problems. While effective exploitation of natural energy of this type has been discussed by scientific researchers, no major breakthrough has been made in this technical field.

In view of the above circumstances, it is therefore an object of the present invention to provide an automatic pumping apparatus utilizing wave motion that can solve the above identified problems of conventional apparatuses, operates stably for a long period of time and hence is feasible for industrial applications.

DISCLOSURE OF THE INVENTION

According to the present invention, the above object is achieved by providing an automatic pumping apparatus utilizing wave motion comprising one or more than one sink-and-float members provided so as to move up and down in accordance with the wave motion, pistons positioned below the respective sink-and-float members, connected to the respective sink-and-float members via a transmission mechanism and adapted to slidingly move in respective one-end-open fixed cylinders in accordance with the up and down movement of the sink-and-float members, pumping pipes connected to the other ends of the cylinders and extending to positions higher than the ranges of up and down movements of the sink-and-float members, a reservoir tank for storing water fed from the cylinders via the pumping pipes and check valves arranged at positions below the level of water in the flow paths from the inside of the cylinders to the reservoir tank for blocking any flow of water running from the reservoir tank toward the cylinders, characterized in that the horizontal cross sectional area of each piston is made small relative to that of each sink-and-float member and inversely proportional to the pumping height.

Preferably, the sink-and-float members are provided with a central through bore, through which the corresponding respective cylinders extends coaxially, and the open ends of the cylinders are arranged at the bottom of the apparatus, the cylinders containing the respective pistons inserted therein, the pistons facing upward.

Alternatively, the cylinders are arranged coaxially under the corresponding respective sink-and-float members with the open ends located in upper positions, the cylinders containing the respective pistons inserted therein, the pistons facing downward.

If the horizontal cross sectional area of each sink-and-float member is $S_0$, that of each piston is $S_1$, the height of the pumping pipes is H and the remaining height for each sink-and-float member to rise or fall in order to generate the pressure to be applied to the related piston is $h_0$, the horizontal cross sectional area of the piston is defined by the equation below.

$$S_0 h_0 = S_1 H$$

If the horizontal cross sectional area of each sink-and-float member is $S_0$, that of each piston is $S_1$, the specified height of a wave motion is h and the remaining height for each sink-and-float member to rise or fall after the first operation of the piston is $h_1$, the height of the water pumped up by the piston for the first time $h-h_1$ and the corresponding volume of the pumped up water are defined by the equation below.

$$S_0 h_1 = S_1 (h - h_1)$$

Likewise, if the remaining height for each sink-and-float member to rise or fall after the second operation of the piston is $h_2$, the height of the water pumped up by the piston for the second time $(h-h_1)+(h-h_2)$ and the corresponding volume of the pumped up water are defined by the equation below.

$$S_0 h_2 = S_1 [(h - h_1) + (h - h_2)]$$

Similarly, the volume of the pumped up water after the third or a subsequent operation is defined by the equation $$S - rS = a - ar^n$$

where r represents common ratio=$(h-h_1)/h$, a represents initial term $H_1=h-h_1$, and n represents the number of times of operation of the piston to fill the pumping pipes with water.

Expressions specifically used in this specification are defined below.

Wording "specified wave height" means the wave height (as adjusted or calculated for the corresponding wavelength actually received as opposed to designed) of water being pumped up from a pumping pipe that is full of water to the reservoir tank at a maximum efficiency in terms of the predetermined cross sectional area of the piston when the outer diameter of the related sink-and-float member is adjusted to become equal to a ½ of the wavelength for the wave height.

Wording "wave height upper limit" means a permissible or selected maximum wave height (as adjusted or calculated for the corresponding wavelength) for a sink-and-float member to operate.

Wording "wave height lower limit" means a permissible or selected minimum wave height (as adjusted or calculated for the corresponding wavelength) for a piston coupled to a sink-and-float member to generate pressure in order to fill the related pumping pipe with water and is equal to a ½ of the specified wave height.

Wording "remaining height to rise" means a height left for a sink-and-float member lifted by a wave motion to rise, as it cannot be raised in proportion to the height of the water pumped up by the piston that is coupled to the sink-and-float member because of the weight of the pumped up water (column of water) borne by the piston.

Wording "remaining height to fall" means a height left for a sink-and-float member pulled down by a wave motion in an alternative embodiment, to fall, as it cannot be pulled down in proportion to the height of the water pumped up by the piston that is coupled to the sink-and-float member because of the weight of the pumped up water (column of water) borne by the piston.

BEST MODES OF CARRYING OUT THE INVENTION

Now, the present invention will be described further by referring to the accompanying drawings that illustrate preferred embodiments of the invention.

Figure 1:
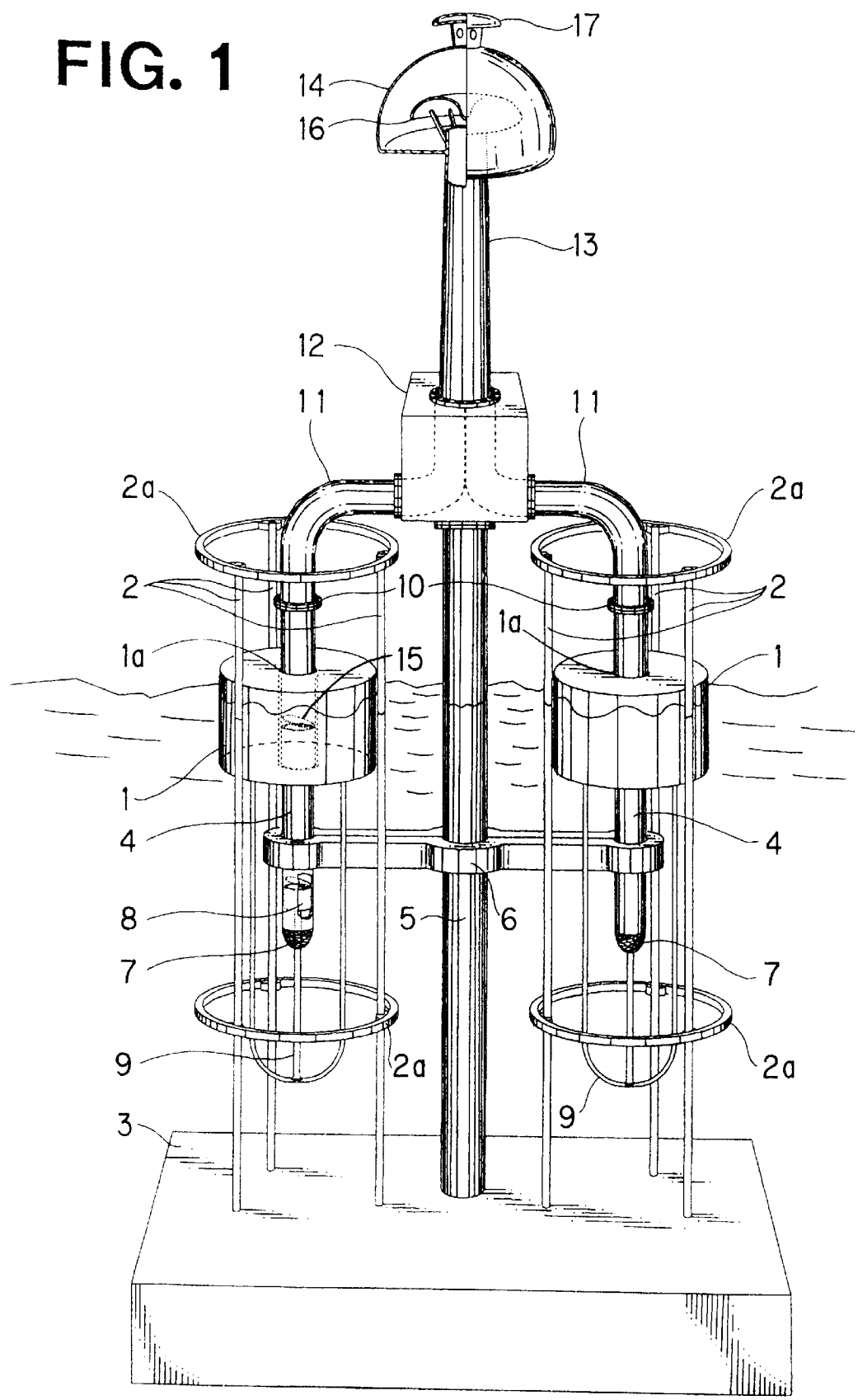
FIG. 1 is a schematic isometric view of an embodiment of the present invention.

FIG. 1 illustrates a first embodiment of automatic pumping apparatus utilizing wave motion according to the invention and comprising sink-and-float members 1 placed on the surface of water and vertically movably supported by respective support frames 2 so as to move up and down according to the wave motion of water. The sink-and-float members 1 are made of a material that is mechanically strong and can withstand any impacts of winds and waves such as titanium. Each of the support frames 2 for supporting the sink-and-float members 1 is of a tripodal structure that can minimize the frictional resistance of water and the three legs are secured to a number of holding rings 2a that surround the corresponding sink-and-float member 1. The three legs of each support member 2 are rigidly anchored to a concrete base 3 formed on the bottom of the sea and standing upright from it. Each sink-and-float member has a central through bore 1a, through which a cylinder 4 coaxially extends. The cylinders 4 are rigidly held by respective arms extending horizontally from a support pillar 5 erected on the base 3 on the bottom. The lower end of each cylinder 4 is open and protected by a net member 7 so that debris may not enter the cylinder 4. Each cylinder 4 contains therein a piston 8 facing upward and slidable in the cylinder, said piston 8 being connected to the corresponding sink-and-float member 1 via a connector rod 9 so that the piston 4 slidingly moves up and down in the cylinder in accordance with the movement of the sink-and-float member 1. The maximum stroke of the cylinders 4 in the pistons 8 is determined by taking the maximum difference of sea level between high and low tides and possible wave heights into consideration.

The upper end of each cylinder 4 is coupled to an end of a branched pumping pipe 11 by means of a joint 10. The other end of the branched pumping pipe 11 is coupled to a pumping pipe coupling cabinet 12 arranged at the top of the support pillar 5 so that all the branched pumping pipes 11 are held in communication with a reservoir tank 14 by way of a main pumping pipe 13 extending upward from the pumping pipe coupling cabinet 12. The capacity of the reservoir tank 14 can be determined according to the intended use of the apparatus.

A check valve 15 is arranged in each cylinder 4 at an upper portion thereof in order to block any reverse flow of water trying to fall down to the bottom of the cylinder from the reservoir tank 14. Note that the check valves 15 are located below the sea level.

As shown in the drawing, the reservoir tank 14 is provided with a buffer cover 16 for buffering impacts of water coming up through the main pumping pipe 13 and also with a vent hole/man hole 17.

Now, the operation of the illustrated apparatus will be described.

Each sink-and-float member 1 is pushed up along the corresponding support members 2 by a rising wave. At the same time, the piston 8 connected thereto moves upward within the cylinder 4. As a result, the valve of the piston 8 is closed to push up the water it carries through the check valve 15 and further upward. As the wave falls, the water surface comes down to pull the sink-and-float member 1 downward so that the valve of the piston 8 becomes open under the pressure of water to allow water to move upward through the piston 8. Thus, as the piston 8 moves up and down within the cylinder 4 in accordance with the wave motion, water is pumped up above the check valve 15 and then into the reservoir tank by way of the branched pumping pipe 11, the pumping pipe coupling cabinet 12 and the main pumping pipe 13. It will be understood that this description holds true for all the pistons of the apparatus.

While each of the sink-and-float members 1 of the embodiment of FIG. 1 does not require a particular weight in order to push up water by means of the corresponding piston 8 when it rises, it requires only a weight that offsets the frictional resistance generated between the sink-and-float member 1 and the piston 8 so that the embodiment of apparatus is advantageous in that light sink-and-float members can be used for it. Additionally, since cylinders 4 are open at the lower ends, they are practically free from deposition of dirt and hence the apparatus provides relatively easy maintenance. Note that the height of the sink-and-float members 1 above the water level is equal to the wave height upper limit when the sea is flat and has no waves.

Figure 2:
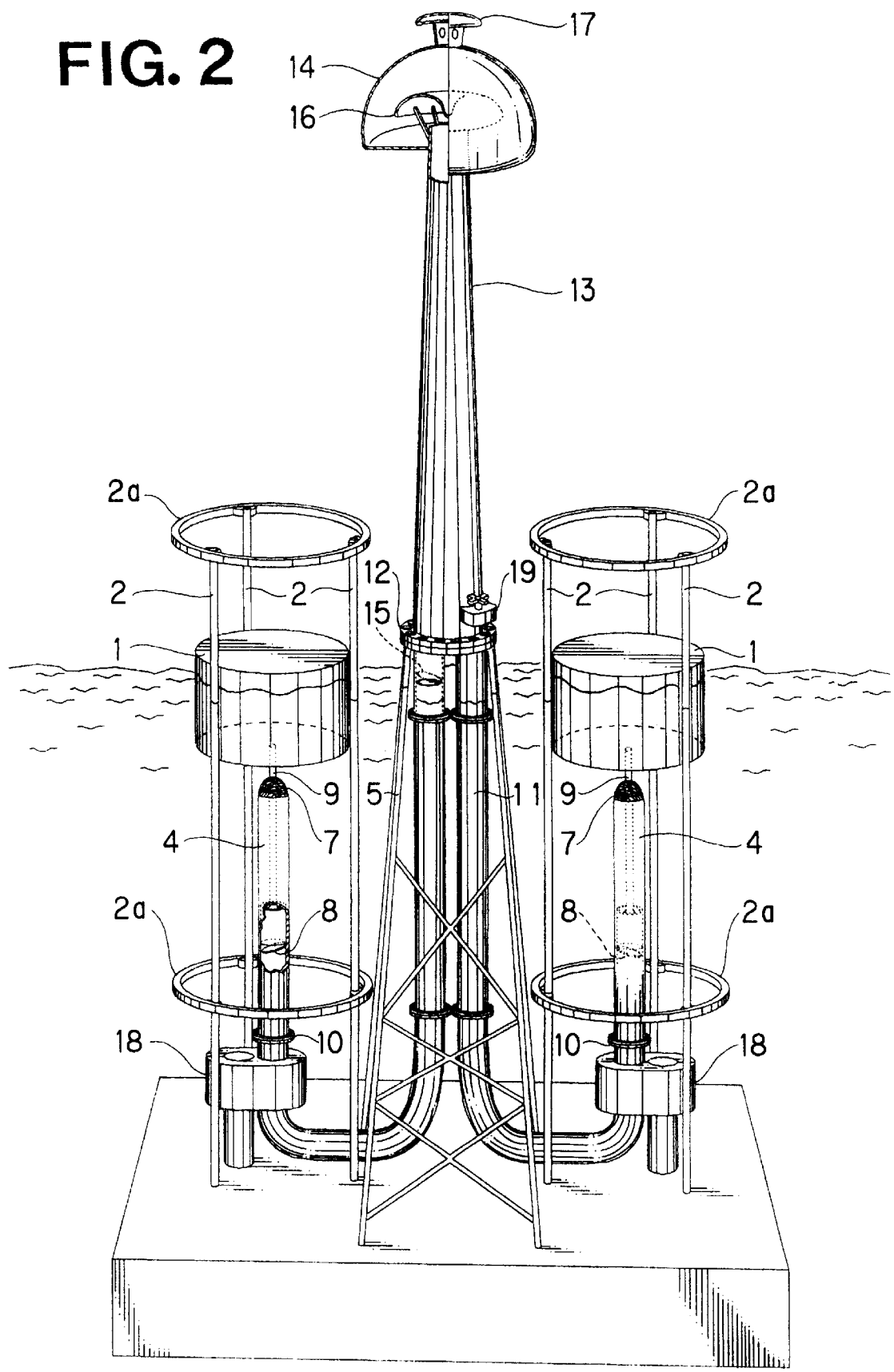
FIG. 2 is a schematic isometric view of another embodiment of the present invention.

FIG. 2 shows a second embodiment of automatic pumping apparatus according to the invention, where those components that are identical or similar to those of FIG. 1 are denoted by the same reference symbols respectively.

The embodiment of FIG. 2 is so designed that each piston 8 is operated to pump up water as the corresponding sink-and-float member 1 falls or water is pumped up, utilizing the weight of the sink-and-float member. More specifically, each cylinder 4 is supported below a corresponding sink-and-float member 1 by a cylinder supporting pillar 18 erected on a concrete base and has an open upper end, while it is connected to a branched pumping pipe 11 at the lower end. The piston 8 faces downward. The check valve 15 is located near the top of the branched pumping pipe 11. Thus, the sink-and-float member is so designed as to show a height above the water level when the sea is flat and has no waves greater than the wave height upper limit. The wave height upper limit is determined as a function of the height of the sink-and-float member 1 hidden under the water level in such a way that the weight of the sink-and-float member 1 hidden under the water level when the sea is flat and has no waves is equal to a weight corresponding to ½ of the wave height upper limit plus the part of the weight corresponding to height of the sink-and-float member 1 corresponding to the weight of the sink-and-float member 1 that can offset the frictional resistance generated between the sink-and-float member 1 and the piston 8 as the latter moves downward. With this arrangement, each piston 8 can be smoothly operated.

In order that each check valve 15 may be smoothly opened and closed by the corresponding piston 8, a locking device is provided to hold an open condition of the check valve. Preferably, the pistons 8 are so designed as to minimize the loss of head waters.

Now, the operation of the embodiment of automatic pumping apparatus will be described. Each sink-and-float member 1 disposed at the water level is pushed up by waves so that the corresponding piston 8 moves upward against the pressure of the water it carries thereon. As a result the valve of the piston is opened to allow water to fall down therethrough. When the sink-and-float member 1 by turn is pulled down by falling waves, the valve of the piston 8 is closed and the water that has been introduced thereunder is raised upward through the check valve 15. As this up and down movement of the piston 8 is repeated in accordance with the wave motion, water is pumped up through the check valve 15 to the reservoir tank 14 via the branched pumping pipe 11 and the main pumping pipe 13. Note that a discharge valve 19 is arranged near the lower end of the main pumping pipe 13 so that it is opened to prevent any dirt from being deposited in the branched pumping pipes 11 of the apparatus when the apparatus is not in operation. It will be understood that this description holds true for all the pistons of the apparatus.

While each of the illustrated embodiments comprises two sink-and-float members and two pistons, the number of sink-and-float member and piston combinations may alternatively be one, three or more than three. For instance, a sink-and-float member, a piston and a branched pumping pipe may be combined into a unit and an appropriate number of such units may be arranged and connected to a single main pumping pipe.

In locations where the wavelength of waves appearing on the water surface varies significantly, there may be arranged a number of branched pumping pipes connected to a single main pumping pipe and provided with respective sink-and-float members having diameters that are different from each other and equal to a ½ of possible different wavelengths respectively. With such an arrangement, the pumping apparatus can operate efficiently regardless of the wavelength of waves.

The effect of an pumping apparatus according to the present invention can be maximized by selecting a location where a long wavelength and a high wave height are available.

A pumping apparatus according to the invention may be designed in such a way that the apparatus can be remotely controlled and the wave conditions of the installation site and troubles that may occur in the check valves, pistons and other components can be monitored or detected remotely. With such an arrangement, the apparatus can be operated automatically to save labor cost although it can be attended quickly once troubles occur.

When a pumping apparatus is to be installed at a site where the sea is deep, a required number of steel pipes may be driven into the bottom in place of forming a concrete base so that the apparatus may be mounted on the steel pipes in order to reduce the overall cost of construction as machine power can significantly replace man power in this type of construction.

For the preparation of a pumping apparatus according to the invention, several values have to be determined in advance, including (1) the height by which water is to be pumped up, (2) the horizontal cross sectional area, the height and the weight of each sink-and-float member and (3) the horizontal cross sectional area of each piston and the length of each cylinder. Of these, the height by which water is pumped up is selected depending on the use of the apparatus. The efficiency of the operation of storing water is maximized when the outer diameter of the sink-and-float members that defines the horizontal cross section thereof is selected to be equal to a ½ of the specified wave height. The height of the sink-and-float members needs to be determined by adding the weight corresponding to the wave height upper limit and the weight corresponding to the part of the height of the sink-and-float members corresponding to the weight of water that can offset the frictional resistance generated between each sink-and-float member and the related support members and each cylinder and the corresponding piston. Finally, while the horizontal cross sectional area of each piston is determined in general in inverse proportion to the height by which water is pumped up relative to the horizontal cross sectional area of each sink-and-float member, it may alternatively be determined as a function of the specified wave height or the wave height lower limit. As for the length of each cylinder, it is preferably determined by taking the maximum difference of sea level between high and low tides and possible wave heights into consideration.

Now, the time and the volume of water to be lifted required to fill the main pumping pipe will be discussed below.

The following values are assumed for the parameters.
1. height of lifting water: equal to or greater than 100 m;
2. profile of each sink-and-float member: cylinder with a through bore (outer diameter: 5 m, inner diameter: 1 m, height: 5 m, weight: $19 \times 10^3$ kg);
3. length of each cylinder: 20 m;
4. wave height upper limit: 4 m;
V: volume of each sink-and-float member ($m^3$);
$S_0$: horizontal cross sectional area of each sink-and-float member ($m^2$);
$S_1$: horizontal cross sectional area of each piston ($m^2$);
H : overall height of the pumping pipes=100 m;
$H_1$: height by which water is lifted by the first operation of each piston (m);

h: specified wave height=3 m (wavelength: 10 m, wave form: rectangular wave);

$h_1$: remaining height for each sink-and-float member to rise after the first operation of the corresponding piston; and $h_0$: remaining height for each sink-and-float member to rise in order to generate the pressure to be applied to the related piston (m)=wave height lower limit (m).

The above defined time and volume will be calculated for the apparatus of FIG. 1, using the above parameters.

The cross sectional area of each sink-and-float member is $$S_0 = \pi r^2 \text{(outer diameter)} - \pi r^2 \text{(inner diameter)}$$

$$\therefore \pi(2.5^2 - 0.5^2) = 19 \text{ m}^2.$$

The volume of each sink-and-float member is $$V = S_0 \times \text{height of sink-and-float member}$$

$$\therefore 19 \times 5 = 95 \text{ m}^2.$$

If the sea is flat and it is partly hidden under water by 1 m, the weight of each sink-and-float member is weight=[V× height under flat water]/height of sink-and-float member $$\therefore (95 \times 1)/5 = 19 \times 10^3 \text{ kg},$$

equal to the weight of water ($10^3$ kg) having a volume (m$^3$) of [$S_0$(m$^2$)×height under flat water].

The specified wave height is ho=h/2 or 3/2=1.5 m.

When the specified wave height is 3 m, the cross sectional area of each piston is determined by equation $$S_0 H_0 = S_1 H \text{ or } 19 \times 1.5 = S_1 \times 100$$

$$\therefore S_1 = 0.285 \text{ m}^2.$$

If the height of water on each check valve is zero in the 100 m high pumping pipes when the sea is flat, the height for each sink-and-float member to rise after the first operation of the corresponding piston can be determined from equation $$S_0 h_1 = S_1 (h - h_1)$$

or $$19 h_1 = 0.285(3 - h_1)$$

or $$\therefore 19.285 h_1 = 0.855 \text{ or } h_1 = 0.44 \text{ m}.$$

Thus, the height by which the piston is pushed up is $$H_1 = h - h_1$$

or $$H_1 = 3 - 0.044 = 2.956 \text{ m}.$$

The height by which water is to be raised for the second time is determined by a geometric series and therefore the number of times of pumping operation required to fill the pumping pipes is expressed by equation below.

$$S - rS = a - ar^n$$

where S represents the height of the pumping pipes H=100 m, r represents common ratio=$(h-h_1)/h=0.985$, a represents initial term $H_1 = h - h_1$ 0 0.985, and n represents the number of times of operation of the piston to fill the pumping pipes with water.

By replacing the symbols with the respective values, $$100(1-r) = a - a(0.985)^n$$

or $$1.5 = 2.956 - a(0.985)^n$$

or $$2.956(0.985)^n = 1.456$$

$$(0.985)^n = 0.493,$$

or the number of times of operation required for each piston is $$n = \log_{0.985} 0.493 = 47.$$

Thus, if the sink-and-float members are subjected to waves having a height of 3 m, the 100 m high pumping pipes will be filled with water when each of the pistons has operated been 47 times, assuming that the pipes have an even diameter from the bottom all the way to the top.

The volume of water Q lifted by each operation of the pistons at and after the 48th operation is expressed by $$S_1(h - h_0)$$

or $$0.285(3 - 1.5) = 0.48 \text{ m}^3/\text{operation}.$$

If a wave that is 3 m high is generated every 8 seconds and a reservoir tank is provided with 8 apparatuses for pumping water, the pumping pipes will be filled with water in 47 seconds and the reservoir tank will start storing water 48 seconds after the start of pumping operation at a rate of 0.43 m$^3$/second.

If the water stored in such a reservoir tank is utilized to generate electricity by means of a water wheel generator, the rate of generating electric power will be as follows.

If the effective head of water is H and the flow rate is Q, the theoretical rate of power generation will be $$9.8 \times Hm \times Qm^3/\text{second} = 9.8 \times 100 \times 0.43 = 420 \text{ KW/second}.$$

It should be noted that the above value is based on the assumption that each component operates at an efficiency of 100% and it should be multiplied by the product of the efficiencies of all the components to obtain a practical value. If such a fresh water type water wheel generator is installed in the sea, a fresh water tank may be disposed under the water wheel and the tank and a lower portion of each cylinder may be linked via a water conduit so that sea water may be prevented from entering the cylinders. With such an arrangement, the generator can be operated by circulating fresh water to form a quasi-closed system, requiring supply of fresh water only at a reduced rate, so that dirt may not enter the circulation system, making it unnecessary to use a double structure for the check valves.

As described above in detail, since an automatic pumping apparatus according to the present invention comprises at least a sink-and-float member that moves up and down according to the wave motion and a piston that operates in response to the up and down movement of the sink-and-float member to continuously forward water in a fixedly secured corresponding cylinder to pumping pipes by its sliding motion in the cylinder and the horizontal cross sectional area of each piston is made small relative to that of the corresponding sink-and-float member and in reverse proportion to the pumping height, it can be operated not only at high and low tides but as long as there is a wave motion having a wave height greater than a predetermined value to ensure an enhanced efficiency of water lifting. Additionally, since the cross sectional area of each piston is made small relative to that of the corresponding sink-and-float member, the pumping height can be determined at will so that head waters can be stored up to approximately 50%, making the apparatus adaptable to a wide range of applications. Furthermore, since mechanically frictional contact takes place only between the pistons and the respective cylinders and between the sink-and-float members and the respective support members, the overall configuration of the apparatus can be made to be very simple. Thus, an automatic pumping apparatus according to the invention can most effectively utilize head waters for the operation of pumping water such that head waters can be stored up to 50% when the sink-and-float members are subjected to the specified wave height, while the remaining 50% may be used for generating energy required for the pumping operation. An apparatus according to the invention may be installed in the sea or a river where waves are high or in a river where waves are practically non-existent, in which case a storage tank may be arranged at a downstream location and the apparatus may be placed in the tank so that the tank may be repeatedly filled with water and evacuated by appropriately opening and closing an inlet valve for leading flowing water into the tank and an outlet valve for leading water to the outlet port of the tank in order to artificially give rise to waves in head waters and make the sink-and-float members move up and down correspondingly. Then, the apparatus can operate to pump water as if there were waves and energy that has not been utilized hitherto may be effectively and efficiently exploited.

INDUSTRIAL APPLICABILITY

70% of the earth's surface is covered by water in the oceans and in rivers and these oceans and rivers present a large number of locations where waves are constantly observed, where a large difference is produced between high and low tides and where remarkable head waters exist. If automatic pumping apparatuses according to the invention are installed in such locations and artificial waves are produced if high waves are not available, then these apparatuses can be used for hydropower generation, irrigation, salt manufacturing, fire fighting and aquariums to make the apparatuses friendly to the environment. Water on the surface of the earth is an undepletable resource and, given a favorable location, it can be used for power generation on a large scale by means of apparatuses according to the invention to generate electric power that can be added to the currently available electric power generated by the existing hydropower plants.

What is claimed is:

1. An automatic pumping apparatus for pumping water by utilizing wave motion to effectuate a pumping stroke and a return stroke, said apparatus comprising:

a stationary supporting frame having a pumping mechanism arranged to be actuated by the wave motion, and a reservoir tank for storing pumped water from the pumping mechanism, wherein the pumping mechanism comprises at least one sink-and-float member provided on said supporting frame to move up and down in response to the wave motion, a connecting rod connected to said sink-and-float member, a piston positioned on and connected to the sink-and-float member via said connecting rod so as to move synchronously therewith during said pumping and return stokes, wherein both said sink-and-float member and said piston each have a cross sectional area and each piston has a cross sectional area smaller than that of the corresponding sink-and float member, a cylinder supported by the stationary supporting frame to receive the piston and having a first end and an open second end communicating with water to be pumped by the piston during the pumping stoke, at least one pumping pipe connected to the first end of said cylinder, and at least one check valve to prevent any flow of water back from said reservoir tank toward the cylinder, each of the cylinders being positioned beneath and coaxially with the sink-and-float member such that said open second end is positioned above said first end and the piston is located within the cylinder and below the open second end.

2. An automatic pumping apparatus for pumping water by utilizing wave motion to effectuate a pumping stroke and a return stroke, said apparatus comprising:

a stationary supporting frame;

a pumping mechanism provided on the supporting frame and arranged to be actuated by the wave motion; and a reservoir tank for storing pumped water from the pumping mechanism;

wherein the pumping mechanism comprises at least one sink-and-float member provided on said supporting frame to move up and down in response to the wave motion, each sink-and-float member having a horizontal cross sectional area $S_0$, at least one piston each being coaxially positioned on and connected to the corresponding sink-and-float member via a connecting rod so as to move synchronously therewith during said pumping and return strokes, each piston having a cross sectional area $S_1$ smaller than the cross sectional area $S_0$ of the corresponding sink-and-float member, at least one cylinder each being supported by the stationary supporting frame to receive the associated piston and having a first end and an open second end communicating with water to be pumped by the associated piston during the pumping stroke, at least one pumping pipe connected to a top end of said cylinder and having a height H, and at least one check valve to prevent any flow of water back from said reservoir tank toward the cylinder, each piston having a piston valve which closes during the pumping stroke and which opens during the return stroke to enable the piston to pass water through the cylinder, wherein each sink-and-float member, each piston and each pumping pipe are arranged to satisfy a relation $$S_0 h_0 = S_1 H$$

where $h_0$ is a specified lower limit of a wave height of the wave motion.

3. An automatic pumping apparatus for pumping water by utilizing wave motion to effectuate a pumping stroke and a return stroke, said apparatus comprising:

a stationary supporting frame;

a pumping mechanism provided on the supporting frame and arranged to be actuated by the wave motion; and a reservoir tank for storing pumped water from the pumping mechanims;

wherein the pumping mechanism comprises at least one sink-and-float member provided on said supporting frame to move up and down in response to the wave motion, at least one piston each being positioned on and connected to the corresponding sink-and-float member via a connecting rod so as to move synchronously therewith during pumping and return strokes, each piston having a cross sectional area smaller than that of the corresponding sink-and-float member, at least one cylinder each being supported by the stationary supporting frame to receive the associated piston and having a first end and an open second end communicating with water to be pumped by the associated piston during the pumping stroke, at least one pumping pipe connected to a top end of said cylinder, and at least one check valve to prevent any flow of water back from said reservoir tank toward the cylinder, each of the cylinders being positioned beneath and coaxially with the sink-and-float member such that said open second end is positioned above said first end and the piston is located within the cylinder and below the open second end.

4. An automatic pumping apparatus utilizing wave motion according to claim 3, wherein, where the horizontal cross sectional area of each sink-and-float member is $S_0$, that of each piston is $S_1$, the height of the pumping pipes is H and the specified lower limit of a wave height is $h_0$, the horizontal cross sectional area of each piston is defined by equation $$S_0 h_0 = S_1 H.$$

* * * * *